*Inventor*
Richard Henry Evans

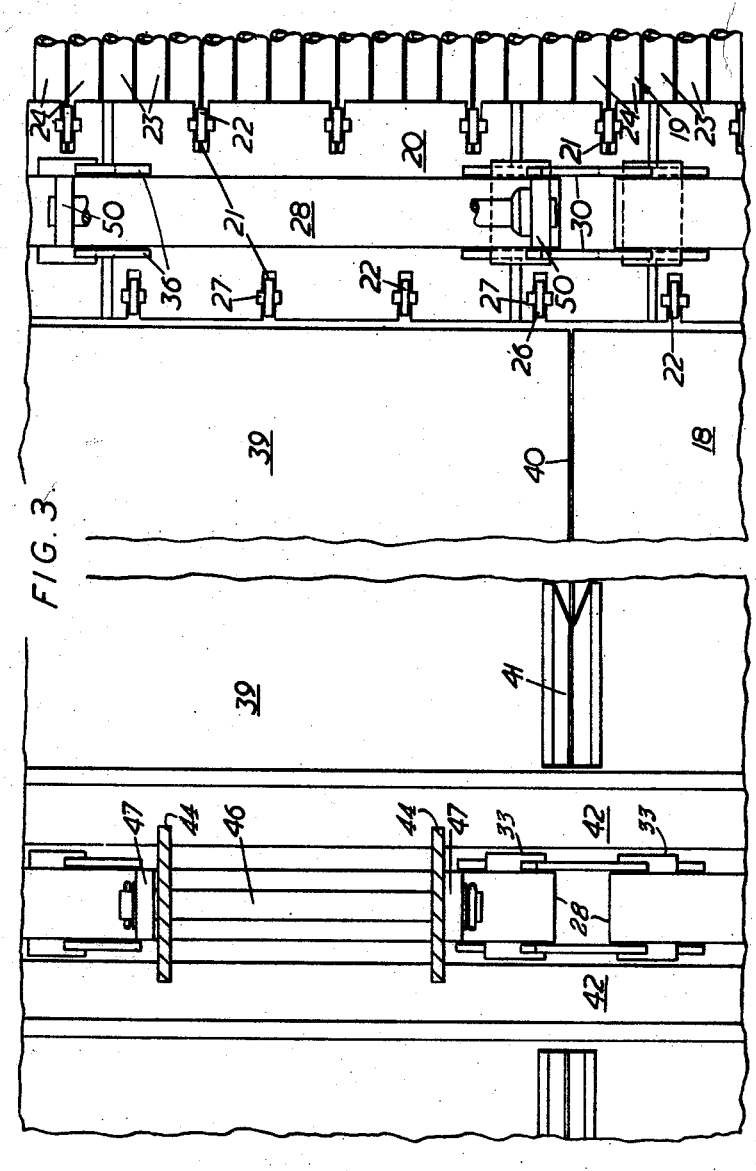

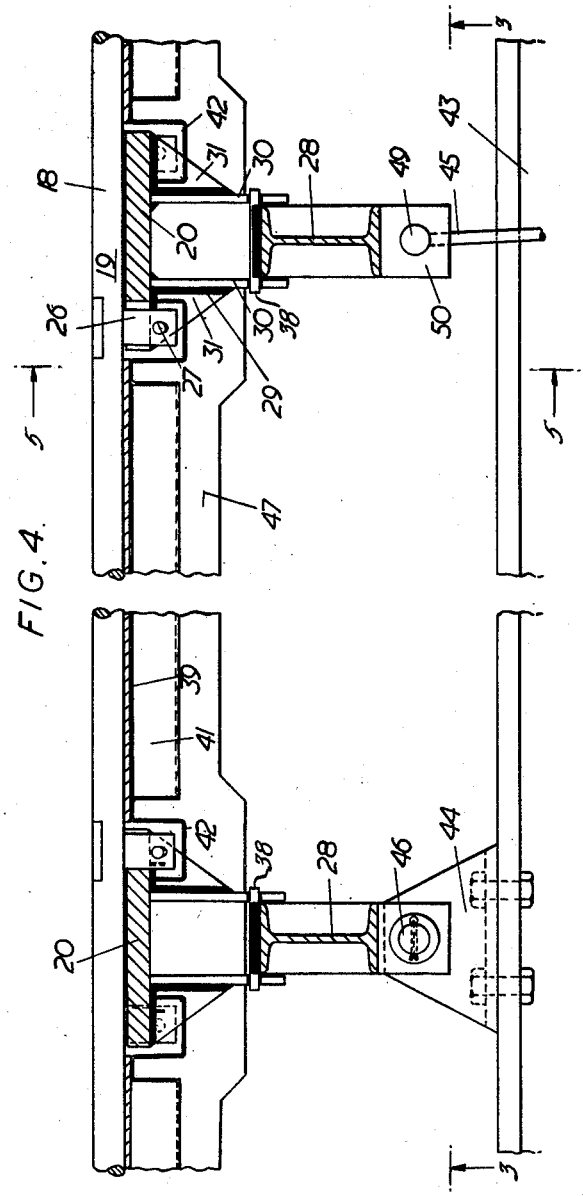

March 16, 1965 R. H. EVANS 3,173,405
ONCE-THROUGH VAPOR GENERATOR
Filed June 9, 1960 17 Sheets-Sheet 4
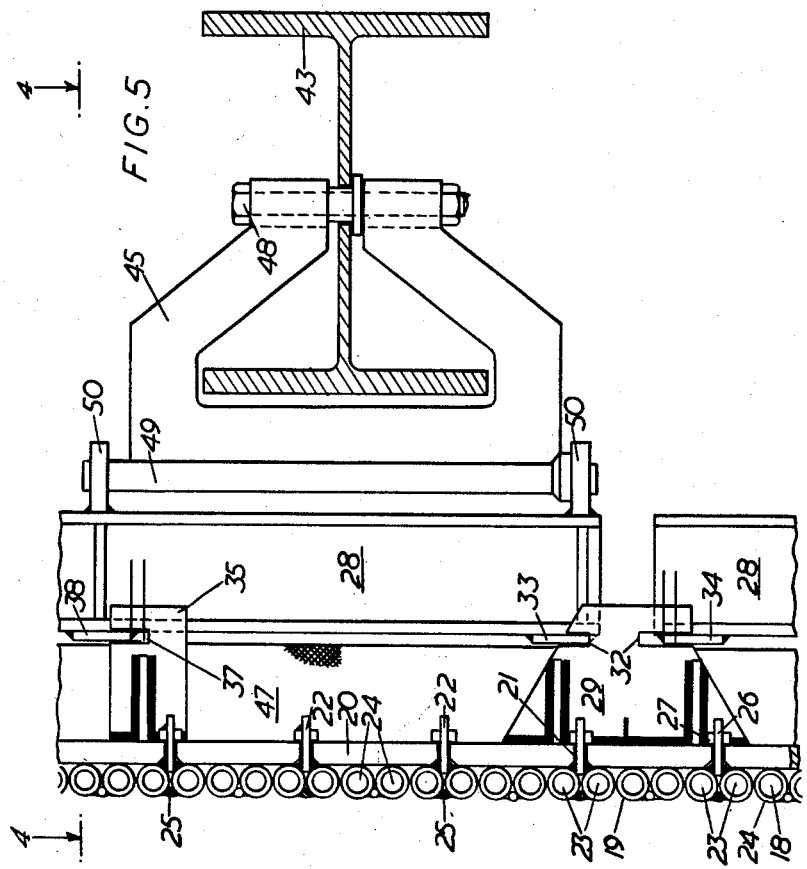
Inventor
Richard Henry Evans
Attorney

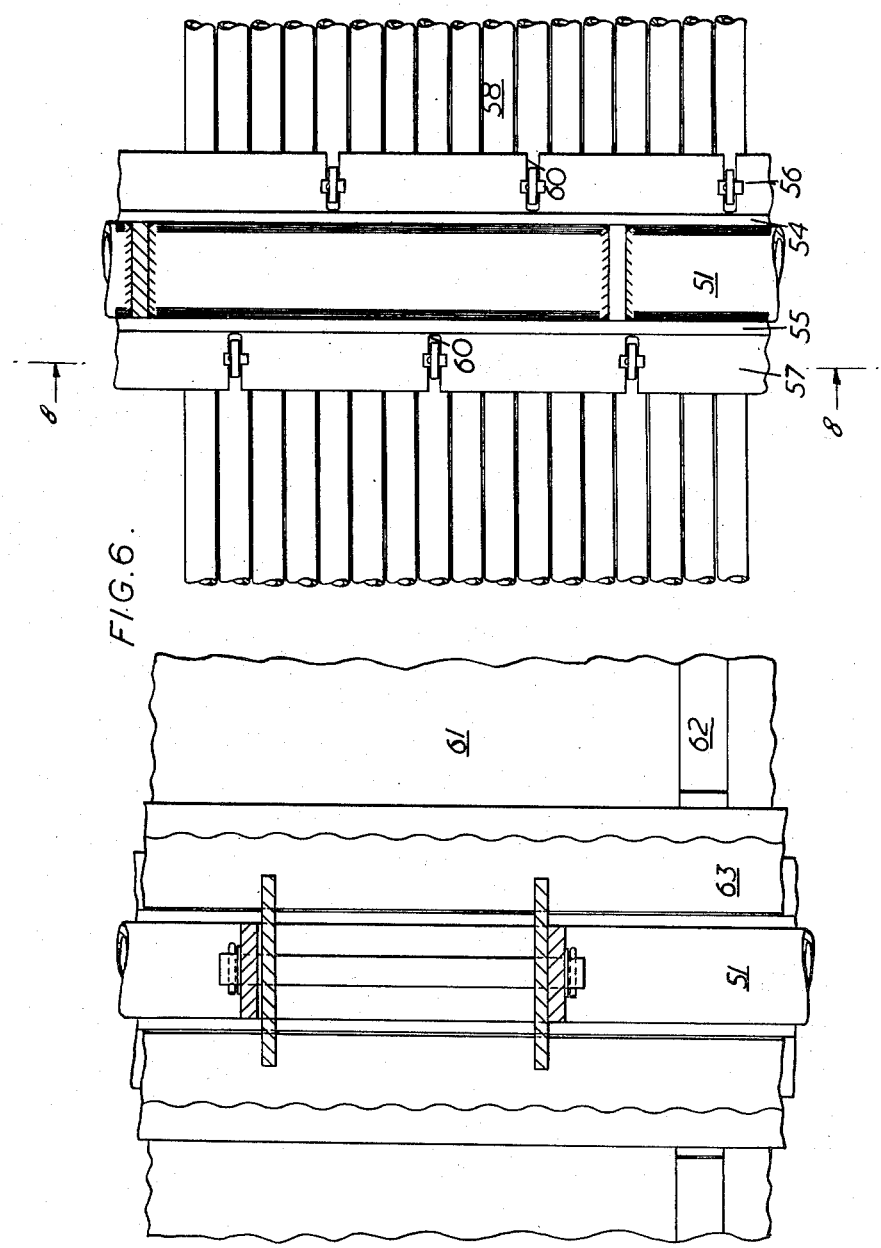

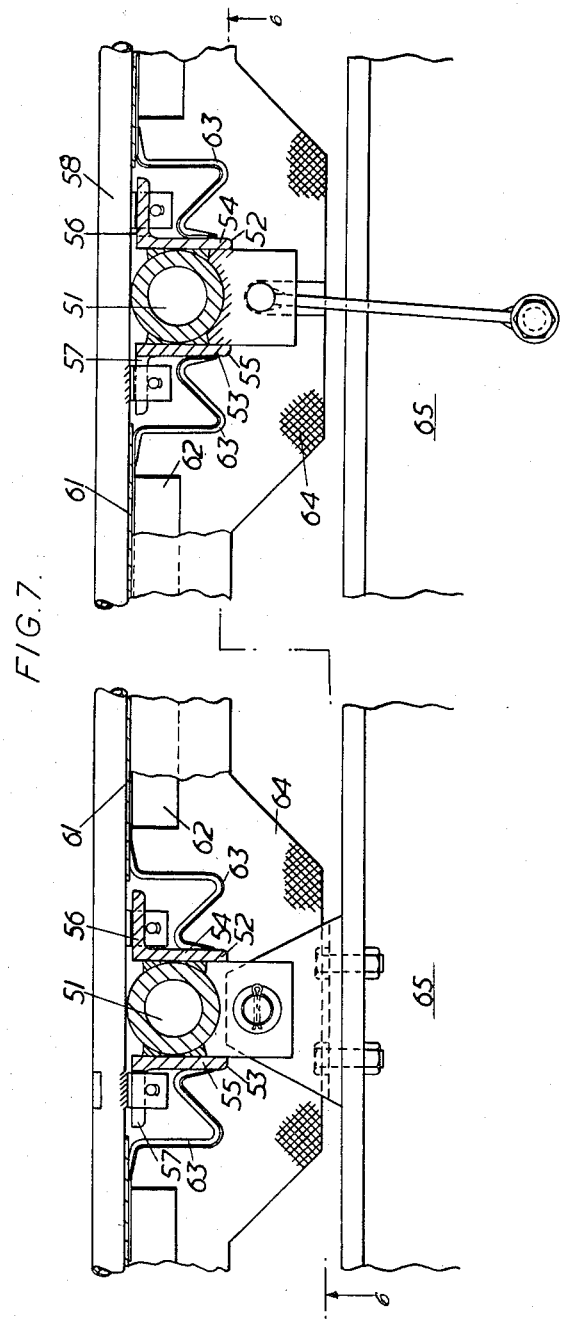

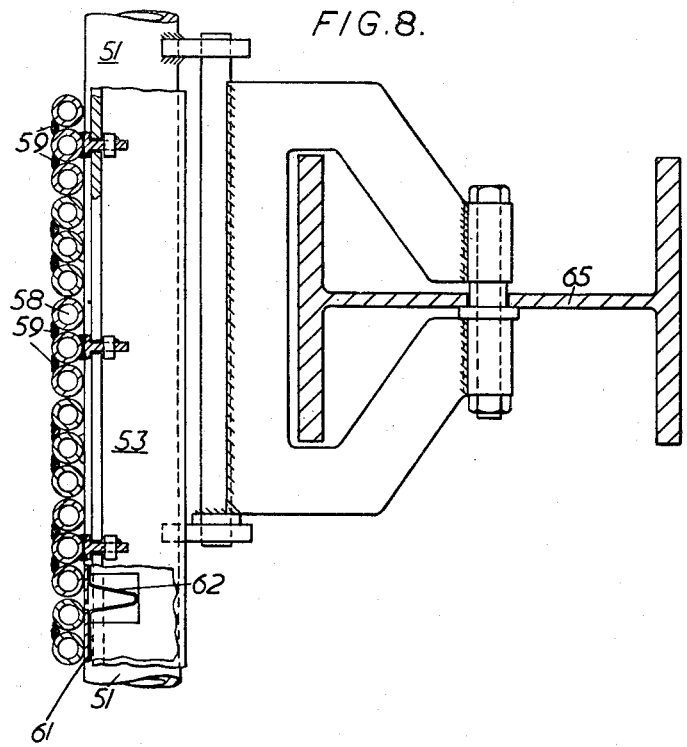

March 16, 1965 R. H. EVANS 3,173,405
ONCE-THROUGH VAPOR GENERATOR
Filed June 9, 1960 17 Sheets-Sheet 8
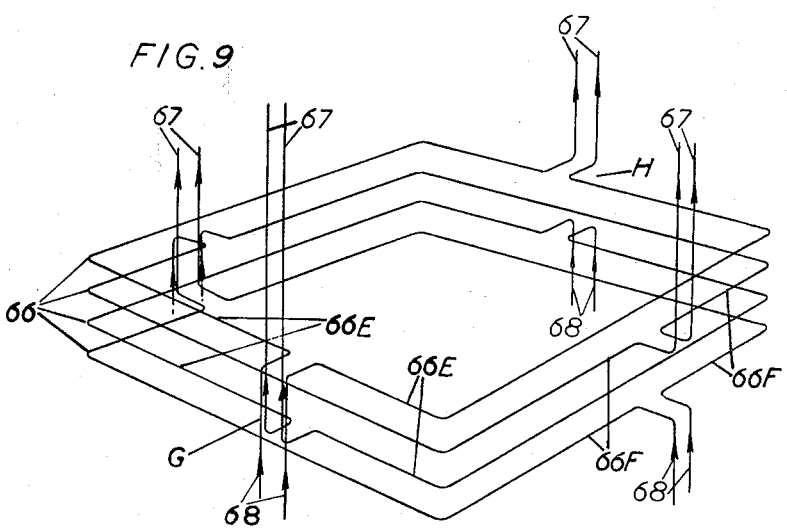
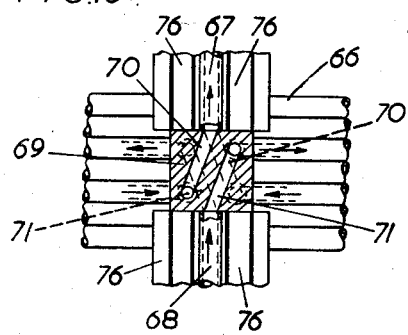
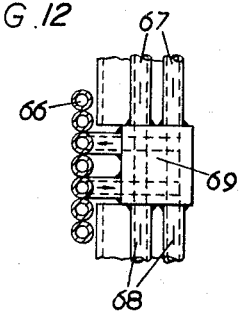
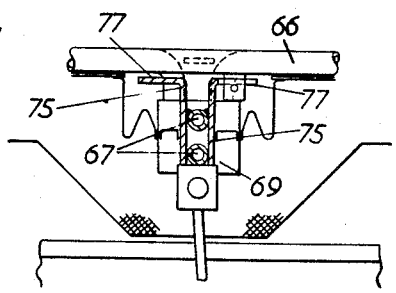
Inventor
Richard Henry Evans
By 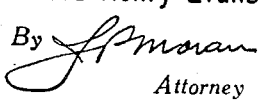
Attorney FIG. 13
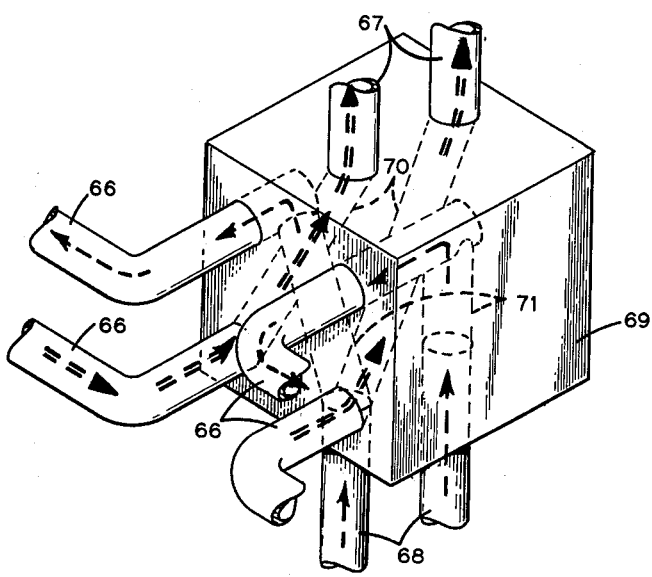
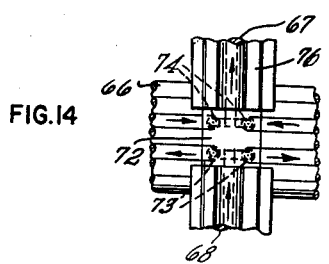
FIG.14
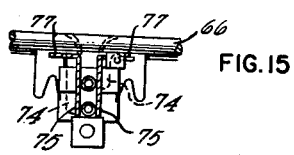
FIG.15

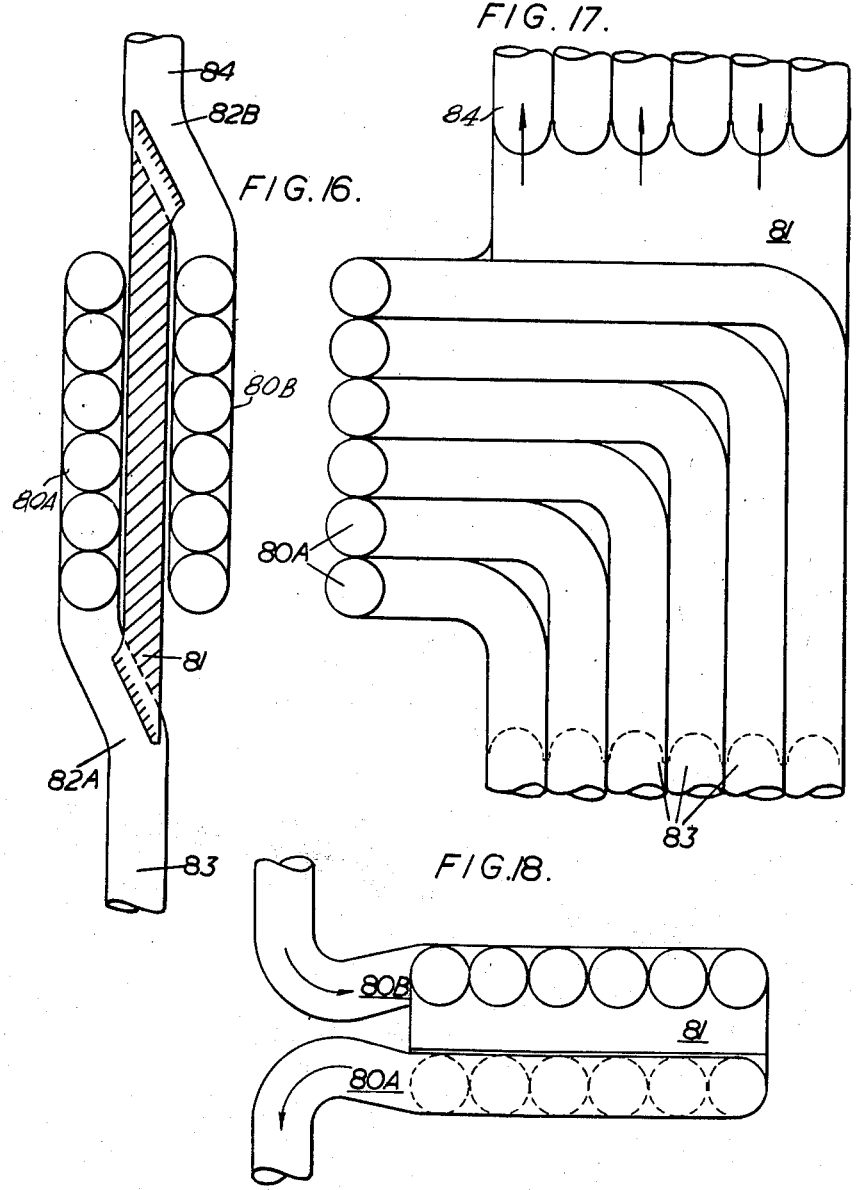

March 16, 1965 R. H. EVANS 3,173,405
ONCE-THROUGH VAPOR GENERATOR
Filed June 9, 1960 17 Sheets-Sheet 11

Inventor
Richard Henry Evans
By *J. P. Moran*
Attorney

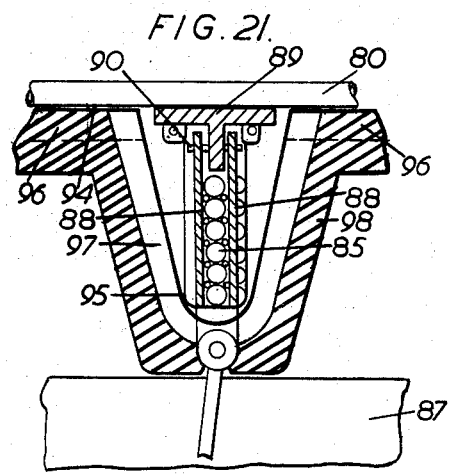
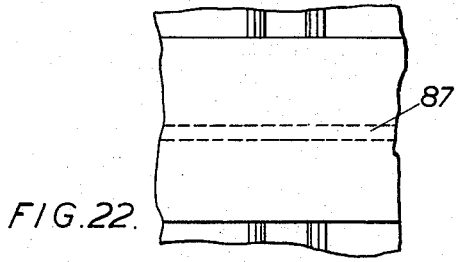
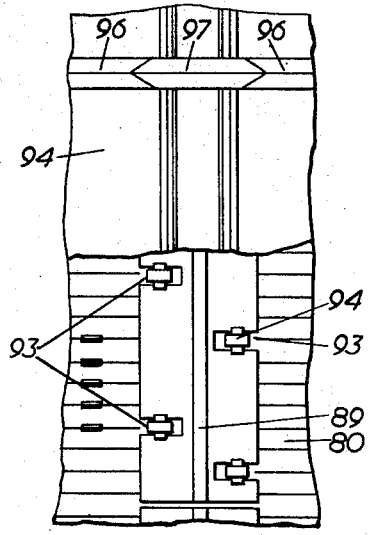

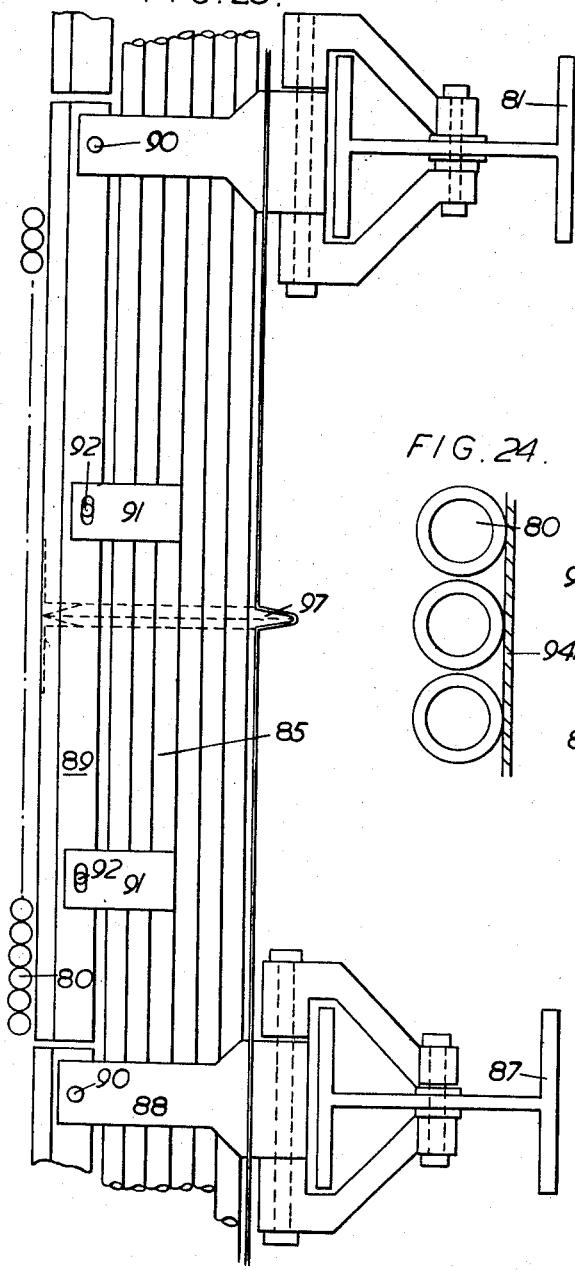

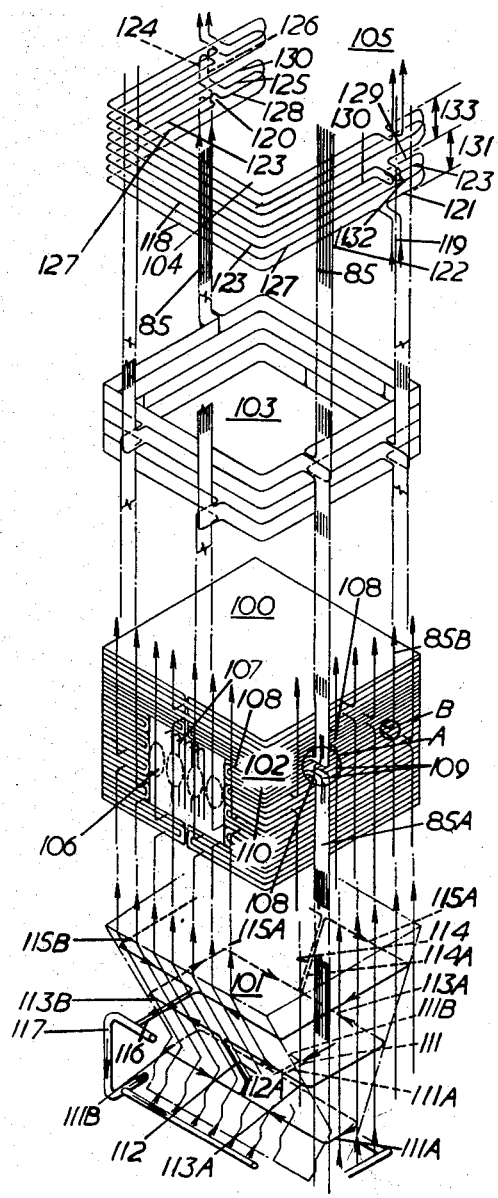

Inventor
Richard Henry Evans

Inventor
Richard Henry Evans

United States Patent Office 3,173,405
Patented Mar. 16, 1965

3,173,405
ONCE-THROUGH VAPOR GENERATOR
Richard Henry Evans, Surrey, England, assignor to Babcock & Wilcox, Limited, London, England, a corporation of Great Britain
Filed June 9, 1960, Ser. No. 93,005
12 Claims. (Cl. 122—510)

This invention relates to tubulous boilers of the kind having tubes or circuits connected in parallel for the flow of working medium and is of especial utility in its application to forced-flow boilers. In a forced-flow boiler and particularly in a once-through boiler having an upright furnace chamber with walls lined by tube lengths of the circuits, it is important for the different circuits to be substantially equally heated and since the rate of heat transfer along the length of the furnace chamber and at any level around the walls of the furnace chamber varies and the variation changes with circumstances, such as rate of firing or the occurrence of deposits on the heat exchange surfaces, the attainment of this desideratum is a matter of difficulty. Allied to the problem of providing a furnace wall tube arrangement adapted to give an approximately balanced heat input to the circuits is the problem of providing tube supports and a furnace casing which are both effective in operation and economical to install and maintain. It will be appreciated also that a furnace wall tube arrangement allowing flexibility in the choice of the size of tube to be used is highly desirable. It will furthermore be appreciated that the provision of a reliable gas-tight furnace casing is very necessary when the furnace is to operate under super-atmospheric pressure.

The present invention includes a forced-flow tubulous boiler having circuits connected in parallel for flow of working medium and an upright furnace chamber space with walls lined by tube lengths of the circuit wherein the tubulous lining has sections extending over respective zones one above the other and each formed by horizontal or substantially horizontal tube lengths of the respective circuits, the tube lengths of the circuits being distributed in the zones in a manner adapted to give approximately equal heat inputs to the circuits.

Advantageously the sections are supported by vertical suspension means adapted during operation of the boiler to be heated so that differential expansion vertically between the tube lengths and the suspension means is largely avoided.

The invention also includes a forced-flow tubulous boiler having circuits connected in parallel for the flow of working medium and an upright furnace chamber space with walls lined by tube lengths of the circuits, wherein the tubulous lining has sections extending over respective zones one above the other and each formed of horizontal or substantially horizontal tube lengths of the respective circuits each of which includes tube lengths located at corresponding or substantially corresponding levels in the different sections which are supported by vertical suspension means adapted during operation of the boiler to be heated so that differential expansion between the tube lengths and the suspension means is largely avoided.

In one form of the invention the suspension means are in contact with the tube lengths at the outer side thereof.

In another embodiment of the invention the suspension means include tubes arranged to be heated by the working fluid of the boiler.

In another embodiment of the invention the suspension means include upright transfer tubes each serving to connect in series tube lengths of a circuit in different zones.

The invention also includes a forced-flow tubulous boiler having circuits connected in parallel for flow of working medium and an upright furnace chamber space with walls lined by tube lengths of the circuits, wherein the tubulous lining has sections extending over respective zones one above the other and each formed by horizontal or substantially horizontal tube lengths of the respective circuits arranged in groups providing sets of adjacent tube length ends distributed around the furnace chamber space, sets of tube length ends each include inlet ends and outlet ends and upright transfer or connector tubes leading to the inlet ends of each of the said sets are connected with superjacent transfer or connector tubes leading from the outlet ends of the set, the said transfer or connector tubes constituting part of suspension means for the sections.

Thus, in one particular form of the invention the tube lengths are arranged in pairs of tubes lengths each having its ends remote from one another and adjacent the respective ends of the other tube length of the pair, the tube lengths of each pair extend in opposite directions from the adjacent ends and form parts of different circuits and the circuits include groups of four circuits, tube lengths of each of which in each zone form two adjacent pairs of tube lengths having a first set of four adjacent tube length ends at one suspension means and a second set of four adjacent tube length ends at a second suspension means and the transfer tubes associated with the first sets in the different zones are arranged in pairs extending side by side in the first suspension means and the transfer tubes associated with the second sets in the different zones are arranged in pairs extending side by side in the second suspension means.

In one embodiment the tube lengths of each of the said two adjacent pairs of tube lengths are connected in circuit by means of two boxes to which are connected upper and lower pairs of transfer tubes and which serve as parts of suspension means.

The invention also includes a forced-flow tubulous boiler having circuits connected in parallel for the flow of working medium and an upright furnace chamber space with walls lined by tube lengths of the circuits, wherein the tubulous lining has sections extending over respective zones one above the other and each formed by horizontal or substantially horizontal tube lengths of the different circuits the tube lengths of which are connected by upright transfer tubes which are arranged in vertically extending sets distributed around the furnace chamber and adapted to form parts of suspension means for the sections.

In one application of the invention the furnace chamber includes a firing zone at which a furnace chamber wall is lined with upright tubes.

In another embodiment of the invention a group of transfer tubes extend upwardly and are connected directly to the inlet ends of a group of contiguous tube lengths, whilst the neighbouring outlet ends of another group of contiguous tube lengths at the same level may be connected to the respective ends of a group of upwardly extending transfer tubes, vertically aligned pairs of transfer tubes of the two groups being connected together by vertical tie members each of which is welded at its ends to cranked parts of the associated pair of transfer tubes.

Considered from one aspect, the invention includes a tubulous boiler having a furnace chamber space with upright tube-lined walls, wherein the tubulous lining has sections extending over different zones one above the other and each formed of horizontal or substantially horizontal tube lengths of respective parallel connected tubes, the tube lengths of the parallel connected tubes being distributed in the zones in a manner adapted to give approximately equal heat inputs to the tubes which are supported by vertical suspension means adapted during operation of the boiler to be heated so that differential expansion vertically between the tube lengths and the suspension means is substantially reduced.

The invention will now be described, by way of example, with reference to the accompanying partly diagrammatic drawings, in which:

FIGURE 3 is a sectional elevation of one form of wall suspension means taken on the line 3—3 of FIGURE 4, parts of the wall casing being removed at the right hand part of the figure;

FIGURE 4 is a sectional plan of the wall suspension means of FIGURE 3 taken on the line 4—4 of FIGURE 5;

FIGURE 5 is a sectional side elevation of the suspension means of FIGURES 3 and 4 taken on the line 5—5 of FIGURE 4 viewed in the direction of the arrows, the wall casing being removed;

FIGURE 6 is a side elevation of part of a furnace wall of a boiler according to the invention and incorporating an alternative form of suspension means, the section being taken on the line 6—6 of FIGURE 7, viewed in the direction of the arrows, the insulation being removed and at the right hand part of the figure, the casing being removed;

FIGURE 7 is a sectional plan view of the furnace wall part of FIGURE 6;

FIGURE 8 is a sectional elevation taken on the line 8—8 of FIGURE 6;

FIGURE 9 is an isometric diagram of eight neighbouring tube lengths in a zone of a furnace having a modified wall tube arrangement;

FIGURE 10 is an enlarged sectional side view of one typical form of transfer connection such as occurs at G in FIGURE 9;

FIGURE 11 is a plan view of the transfer connection of FIGURE 10;

FIGURE 12 is an end elevation of the transfer connection of FIGURES 10 and 11;

FIGURE 13 is a perspective view of the transfer connection of FIGS. 10–12;

FIGURE 14 is an enlarged side view of another typical form of transfer connection such as occurs at H in FIGURE 9;

FIGURE 15 is a plan view of the transfer connection of FIGURE 14;

FIGURE 16 is a sectional elevation of a plate sling type transfer connection between groups of 6 transfer tubes for use in a boiler having furnace wall tubes arranged according to FIGURE 1;

FIGURE 17 is a side elevation of the transfer connection of FIGURE 16;

FIGURE 18 is a plan view of the transfer connection of FIGURES 16 and 17;

FIGURE 21 is a plan view of horizontal buckstay support means for use in the wall of FIGURE 20 and to a larger scale than that figure;

FIGURE 22 is a front elevation of part of the wall of FIGURE 20 to an enlarged scale, part of the casing and buckstay suspension means being removed;

FIGURE 23 is a sectional side elevation of the wall part of FIGURE 22 with part of the wall casing removed to show upper and lower horizontal buckstay support means;

FIGURE 24 is a sectional view of part of the wall of FIGURE 20 to an enlarged scale showing one form of skin casing;

FIGURE 25 is a view similar to that of FIGURE 24 of a modified form of skin casing;

FIGURE 26 is an isometric diagrammatic view of a furnace chamber wall tube arrangement;

Figure 1:
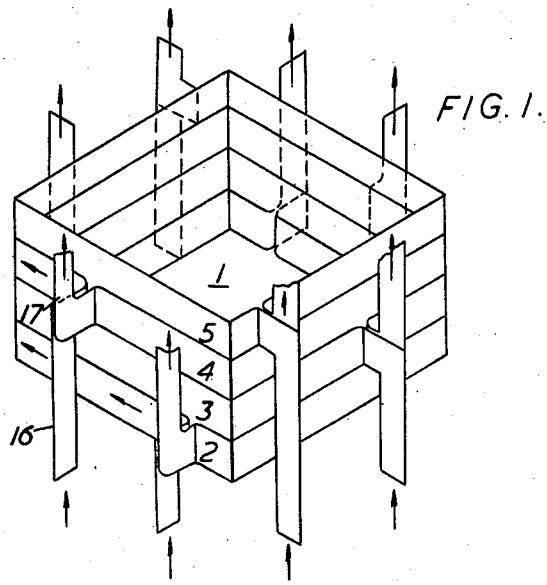
FIGURE 1 is an isometric view of part of an upright furnace chamber having horizontal wall tubes.
Figure 2:
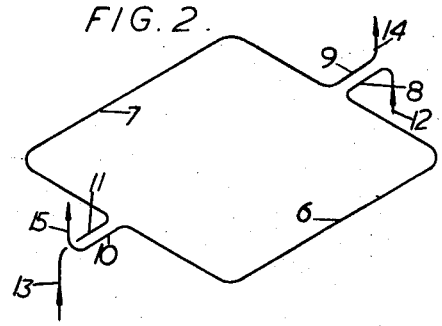
FIGURE 2 is a flow diagram relating to a pair of tubes of the furnace of FIGURE 1 at the same level.

FIGURE 1 shows part of an upright furnace chamber 1 of a forced flow boiler, suitably fired by burners, not shown, arranged to discharge into a lower region thereof through a pair of opposite walls. The chamber 1 is lined with horizontal wall cooling tube lengths arranged in sections 2, 3, 4 and 5 extending over respective zones one above the other, the tube lengths of each section being connected in respective circuits for the flow of working medium in parallel through the circuits. The sets of tube lengths comprise groups of pairs of tube lengths, each pair of tube lengths being arranged as shown in FIGURE 2. In FIGURE 2, two tube lengths 6 and 7 are similarly formed and disposed at the same level, each tube length 6 and 7 extending round substantially one half of the perimeter of the furnace chamber. Each tube length 6 and 7 has an inlet and an outlet end remote from one another and adjacent to ends of the other tube of the pair. Thus, the tube length 6 is arranged with its inlet end 8 adjacent the outlet end 9 of the tube length 7, and with its opposite outlet end 10 adjacent the inlet end 11 of the tube length 8, the tube lengths 6 and 7 being arranged for flow of fluid clockwise round the furnace chamber 1 as seen in plan. The ends of the tube lengths 6 and 7 are formed with respective upright transfer tubes for connection to respective tube lengths in different sections. Thus the inlet ends 8 and 11 of the tube lengths 6 and 7 are formed with respective upright transfer tubes 12 and 13 extending upwardly from associated tube lengths of a lower section, and the outlet ends 9 and 10 are formed with respective upright transfer tubes 14 and 15 extending upwardly for connection to associated tube lengths of an upper section.

Each of the sections 2, 3, 4 and 5 is composed of a group of six pairs of tube lengths such as the tube lengths 6 and 7, so that each section is of height equivalent to six tubes side by side, the pairs of tube lengths of each group being arranged with respective ends adjacent one another so that for each section there are two sets of inlets and outlets, and at each set a group of six upright transfer tubes, such as the group 16 in FIGURE 1, extends upwardly from a lower section to connect with the inlet ends of the set, and a group of six upright transfer tubes, such as the group 17 of FIGURE 1, extends upwardly from the outlet ends of the set for connection to the inlet ends of an upper set.

The sections of tube lengths lining the furnace chamber 1 are advantageously supported by vertical suspension means adapted during operation of the boiler to be heated so that differential expansion vertically between the tube lengths is largely avoided. Different forms of vertical suspension means for application to a boiler of the nature of that described in connection with FIGURES 1 and 2 will now be described.

In one form of the invention the suspension means are in contact with the horizontal wall tube lengths at the outer side thereof.

In the embodiment of FIGURES 3 to 5 suspension means in each wall are each reinforced by vertical staying means connected with the suspension means in a manner adapted to limit heat transfer to the vertical staying means from the suspension means, and the vertical staying means are associated with horizontal buckstays.

In FIGURES 3 to 5, an upright wall 18 of horizontal tube lengths 19 is provided with a plurality of suspension means each including a vertically elongated plate 20. The plates 20 are arranged in vertical rows, spaced apart, and groups of tube lengths 19 are anchored to the suspension means, the tube lengths of each group being connected together. Each plate 20 has in each of its opposite vertical edges a series of slots 21, the slots in the two edges being staggered and the slots 21 in one edge accommodating respective anchoring means 22 of alternate groups 23 of tube lengths 19 and the slots in the other edge accommodating respective anchoring means 22 of the other groups 24 of tube lengths 19.

Each of the groups 23 and 24 comprises two tube lengths 19 united from point to point along their lengths by short rods 25 welded to the tube lengths 19, at the inner side of the wall 18 remote from the plates 20, and each anchoring means 22 includes an anchoring plate 26 welded to and extending outwardly from the two tube lengths of the associated group and passing through a slot 21 in plate 20, at the outer side of which is a pin 27 passing through an aperture in the anchoring plate 26 and engaging an outer face of the plate 20. The slots in the plates 20 and the anchoring means 22 are suitably dimensioned and arranged to permit longitudinal expansion of the tubes 19 in relation to the plates 20.

At least some of the suspension plates 20 in the wall 18 are reinforced by vertical staying means 28, and extending outwardly from such suspension plates 20 at spaced locations in the vertical length thereof are brackets 29 each formed with a pair of parallel, vertical plates 30 having associated strengthening gussets 31 and formed in the upper and lower edges thereof, and near their outer edges, with recesses 32. Extending between adjacent brackets is a vertical stay 28 in the form of an upright, I-section member formed with cross bars 33 and 34 seating within the recesses 32 in the upper edges of the plates 30 of the lower bracket 29 and the lower edges of the plates 30 of the upper bracket 29. At least one intermediate bracket 35 is provided and comprises parallel plates 36 having their faces vertical and formed in their upper edges with recesses 37 in which are engaged the ends of a complementary cross bar 38 provided on the vertical stay 28. The recesses 37 are suitably formed of sufficient depth to permit the relative upward expansion of that part of the tubulous wall 18 between the lower bracket 29 and the intermediate bracket 35.

Advantageously the suspension plates 20 form part of a metal casing applied to the outer side of the wall 18. To this end thin metal plates 39 are secured to the tube lengths 19 so as to be in good thermal conducting contact therewith, edges of the plates 39 being spaced slightly from adjacent edges of neighbouring suspension plates 20 and horizontally extending gaps 40 being left between neighbouring plates 39. The gaps 40 are bridged by flexible sealing strips 41 of V-section having edge flanges united with respective plates 39. Gaps between the plates 39 and the suspension plates 20 are bridged by flexible sealing strips 42 of U-section which extend over the slots 21 in the edges of plates 20 and are formed with edge flanges united respectively to the plates 20 and casing plates 39.

The casing, comprising the plates 20 and 39 and the sealing strips 41 and 42 is suitably provided with thermal insulation 47 on the side thereof remote from the tubes 18.

Horizontal buckstay means are associated with the vertical staying means 28 and serve to support the wall 18 against horizontal movement. Each horizontal buckstay serves to support a number of suspension plates 20 in the wall 18, thus an horizontal buckstay 43 in the form of an I-section member arranged with its web horizontal and its flanges upright is connected to a number of plates 20 associated with a band of horizontal wall tubes 19. At or near the centre of the wall 18, as is shown in the left hand part of FIGURE 4, the horizontal buckstay 43 is connected to the vertical buckstay 28 associated with a plate 20 by an anchor bracket 44, whilst the horizontal buckstay is connected to the vertical buckstays 28 associated with other plates 20 by respective links 45, as seen at the right hand side of FIGURE 4, adapted to permit relative horizontal movement between the plates 20 and the horizontal buckstay 43 in the direction of the length of the buckstay 43, and in opposite directions on opposite sides of the anchor bracket 44. Referring to the left hand side of FIGURE 4, the buckstay 43 is secured at its centre to a vertical buckstay 28 by the anchor bracket 44 which is clamped to the upright flange of the buckstay 43 near the wall 18 and includes a pin member 46 passing through the bracket 44 and through spaced lugs 45 provided on the vertical buckstay 28. At each other vertical buckstay 28, as is shown at the right hand side of FIGURE 4 and in FIGURE 5, the buckstay 28 is connected to the web of the horizontal buckstay 43 by a C-shaped link 45 embracing the flange of the buckstay 43 nearer the wall 18 and hingedly connected to the web at the centre thereof by a pin 48. The link 45 is hingedly connected to the associated vertical buckstay 28 by means of an upright pin 49 secured to the link 45 and passing through apertures formed in spaced lugs 50 provided on the buckstay 28.

The pivots of the link 47 are provided with suitable free play so that swinging of the link 45 may readily take place. During operation, swinging of the link 47 due to differential thermal expansion between the tube lengths 19 and the buckstay 43 is small and the link is arranged to lie normal or substantially normal to the longitudinal axis of the buckstay 43 from which angular position it does not depart greatly during operation.

Figure 19:
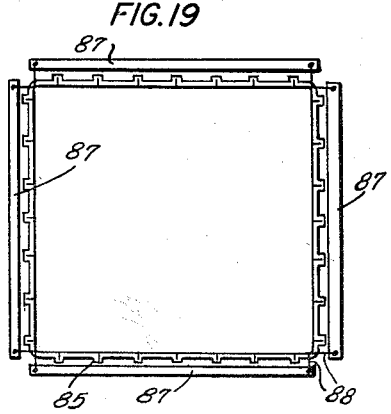
FIGURE 19 is a diagrammatic plan view of a furnace chamber of the general type of FIGURE 1 showing the position of horizontal buckstays relative to the walls and transfer tubes.
Figure 19A:
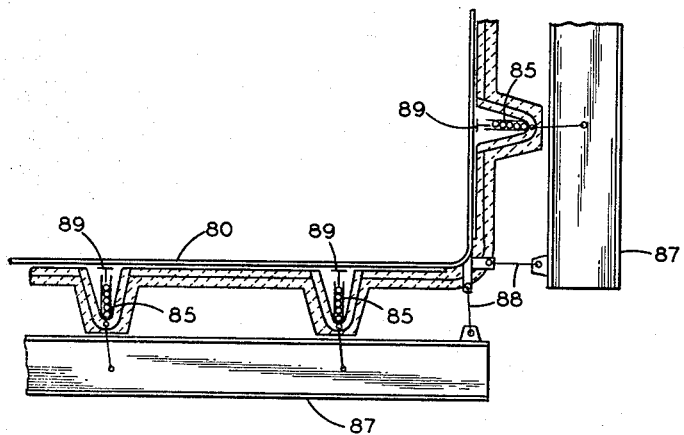
FIGURE 19A is an enlarged view of a portion of the structure of FIGURE 19.

The manner of supporting the horizontal buckstays in their proper positions against movement normal to the walls will be described below in connection with FIGURE 19.

In another embodiment of the invention, as shown in FIGURES 6 to 8, the vertical suspension means includes tubes arranged to be heated by the working fluid of the boiler. Each suspension means includes an upright thick walled tube 51 disposed between flanges of a pair of upright right angle-section members 52 and 53 which have respective first limbs 54 and 55 welded to the tube 51 at opposite sides thereof and respective second limbs 56 and 57 extending outwardly from the tube 51 in opposite directions adjacent horizontal tube lengths 58 forming the lining of the furnace chamber. The tube lengths 58 are arranged in groups of three contiguous tube lengths which are united from point to point along their lengths by short rods 59 disposed in the recesses between the tube lengths on the side thereof remote from the tubes 51 of the suspension means, and welded to the tube lengths 58.

Alternate groups of tubes 58 are anchored to the limb 57 of the suspension means and the other groups of tube lengths 58 anchored to the limbs 56 of the suspension means. The anchoring of the groups of tube lengths 58 to the limbs 56 and 57 is effected in the manner described with reference to FIGURES 3 to 5 for the plate 20 and the tube lengths 19, the limbs 56 and 57 being provided with slots in staggered relationship in the manner previously described. Thus anchored to each suspension means are groups of three tube lengths 48 connected together, the second limbs 56 and 57 of the suspension means are formed in their edges with slots 60, the slots 60 in the two edges being in staggered relationship and the slots 60 in one edge accommodate respective anchoring means of alternate groups of tube lengths 58 while the slots 60 in the other edge accommodate respective anchoring means of the other groups of tube lengths 58.

A casing of sheet metal panels 61 is applied to the tube lengths 58 at the outer side thereof, resilient horizontal sealing strips 62 of V-section bridging horizontally extending gaps between adjacent panels, and resilient vertical sealing strips 63 of W-section are provided between the suspension means and adjacent panels. The vertical strips 63 are arranged with outer limbs of the W respectively seal welded to the first limb 54 or 55 of the adjacent angle section member 52 or 53 of the suspension means and to the adjacent panel 61 and are suitably curved to impart resilience for accommodating relative horizontal movement between the panel 61 and the angle section member 53.

Suitable insulation 64 is provided at the outer side of the casing and horizontal buckstays 65 affording support to the tubes 51 are anchored at their centres and connected by swinging links to respective tubes 51 in the manner previously described in connection with the buckstays 43 and the vertical stays 28 of FIGURES 3–5.

The tubes 51 comprise short lengths which are arranged at horizontally spaced intervals in the wall in vertically aligned rows, the tubes 51 of each row being welded together in fluid tight manner and suitably being connected in the fluid flow path of the boiler. For example, the tube lengths 51 may be connected between an economiser section and the tube lengths 5 lining the furnace wall, or they may be connected to the fluid flow path at any suitable location where the working temperature of the fluid is sufficiently close to that of the fluid flowing through the tube lengths 58 adjacent the tubes 51 as to reduce the differential thermal expansion therebetween.

In another embodiment of the invention the suspension means include upright transfer tubes each serving to connect in series tube lengths of a circuit in different zones. The tube lengths are, for example, arranged in groups of pairs of tube lengths as has been described in connection with FIGURES 1 and 2, each tube length of a pair having its ends remote from one another and adjacent to respective ends of the other tube length of the pair and to respective ends of the tube lengths of another pair or other pairs of tube lengths of the group; and at each of the two sets of adjacent tube length ends so formed, each inlet transfer tube is connected to a superjacent outlet transfer tube.

In one particular form of the invention shown in FIGURE 9, the horizontal tube lengths lining the wall of a furnace chamber are arranged in pairs of tube lengths 66 each having its ends remote from one another and adjacent the respective ends of the other tube length of the pair. As seen in FIGURE 9, the tube lengths 66 of each pair extend in opposite directions from the adjacent ends and form parts of different circuits, the circuits being arranged in groups of four circuits. The tubular lining of the furnace chamber has sections extending over respective zones one above the other, each section comprising horizontal tube lengths 66 of respective circuits. Each circuit includes tube lengths 66 located at corresponding levels in the different sections. The tube lengths 66 of each group and in each zone form two adjacent pairs of tube lengths having a first set of four adjacent tube length ends at one suspension means on one side of the furnace chamber, and a second set of four adjacent tube length ends at a second suspension means in an opposite side wall of the furnace chamber. Neighbouring groups of four tube lengths are arranged in a similar manner to each other but alternate groups have their tube length ends in one pair of opposite walls and the remaining groups have their tube length ends in the other opposite walls of the furnace chamber, and as shown in FIGURE 9, pairs of tube lengths of the alternate groups alternate vertically, with pairs of tube lengths of the other groups.

Referring more particularly to FIGURE 9 there is a group of four tube lengths 66E and a group of four tube lengths 66F, the tube lengths being arranged with pairs of tube lengths 66E alternating vertically with pairs of tube lengths 66F, the pairs being disposed one above the other, the sets of ends of the tube lengths 66E being disposed in one pair of opposite walls and the ends of the tubes 66F being disposed in the other pair of opposite walls of the furnace chamber. There are four sets of tube length ends, at each set there being four tube length ends, a pair of inlet ends and a pair of outlet ends, and from each pair of outlet ends a pair of upright transfer tubes 67 extends upwardly for connection to respective inlet ends of an upper group of tube lengths in a corresponding position in an upper section of furnace chamber lining and a pair of upright transfer tubes 68 extend downwardly from each pair of inlet ends to respective outlet ends of a lower group of tube lengths in a corresponding position in a lower section of furnace chamber lining.

As seen at detail G in FIGURE 9, at a first set of tube length ends associated transfer tubes 68 and 67 extend side by side whereas, as seen at detail H of FIGURE 9 the transfer tubes 67 are axially aligned with respective transfer tubes 68 and the tubes 67 and 68 extend one above the other.

The groups of four tube lengths, such as the group associated with the set of tube length ends at detail G of FIGURE 9 are arranged in each section of the furnace chamber lining to provide a plurality of laterally spaced sets of four tube length ends, so that the transfer tubes 67 and 68 associated with each set may extend in upright manner to corresponding positions in the next adjacent upper and lower sections without interference with the transfer tubes associated with other sets of tube length ends.

It will be appreciated that as described, each tube length 66 extends around substantially one half of the periphery of the furnace chamber, but other arrangements are possible. Thus, for example, each tube length may extend only from a point in one wall of the furnace chamber to a point in an adjacent wall, the tube lengths extending through substantially one quarter of the furnace chamber periphery, or alternatively each tube length may extend substantially entirely around the periphery of the furnace chamber.

The suspension means in the embodiment described are effected by suitably connecting the transfer tubes at each set of tube length ends so that the tubes 67 are secured to the tubes 68 as regards vertical loads and the transfer tubes 67 and 68 serve as parts of suspension members for the walls of the furnace chamber.

In a particular form to be described below in connection with FIGURES 10 to 15, the transfer tubes at each set of tube length ends are connected in circuit by means of boxes to which are connected upper and lower pairs of transfer tubes and which serve as part of suspension means.

In FIGURES 10 to 13 is shown a box connecting four transfer tubes 67 and 68 which are arranged as described in connection with detail G of FIGURE 9, like reference numerals referring to similar parts in FIGURES 9 to 13. A forged steel box 69 is provided with respective pairs of apertures in its upper and lower surfaces and with four apertures in a face of the box adjacent the wall tubes 66. At the box 69, the ends of the tube lengths 66 associated therewith are bent outwardly from the wall and are connected to respective apertures in the said face of the box to connect with respective bores 70 and 71 formed in the box and comprising a pair of bores 71 associated with the lower pair of tube length ends and a pair of bores 70 associated with the upper pair of tube length ends. The bores 70 lead upwardly to the outlet apertures in the upper face of the box into which are connected respective transfer tubes 67 while the bores 71 lead downwardly to the inlet apertures in the lower face of the box to which the transfer tubes 68 are respectively connected. Thus the lower transfer tubes 68 connect to respective bores 71 in the box severally leading to the tube lengths of the upper pair of tube lengths whilst the upper pair of transfer tubes 67 lead from respective bores 70 in the box to which the tube lengths of the lower pair are severally connected.

In FIGURES 14 and 15 is shown a box, similar in character to box 69 above-described, connecting four transfer tubes which are arranged as has been described in connection with detail H of FIGURE 9, and like reference numerals refer to similar parts in FIGURES 9 to 15. A forged steel box 72 is provided in its upper and lower surfaces with respective pairs of apertures and in its face adjacent the wall tubes 66 with a group of four apertures. At the box 72, the four wall tubes associated therewith are bent outwardly from the wall and their ends connect with respective apertures in the front face of the box. The lower transfer tubes 68 connect with respective apertures in said lower face of the box from which respective passages 73 lead severally to the tube lengths 66 of the lower pair of tube lengths while the upper pair of transfer tubes 67 connect with respective apertures in said upper face of the box from which respective passages 74 severally lead to the tube lengths 66 of the upper pair.

In the arrangements of FIGURES 10 to 13 and 14–15, the pairs of transfer tubes 67 and 68 are arranged with their axes lying in a plane normal to the furnace chamber wall and are disposed between and welded to spaced, parallel flanges 75 of right angle-section members 76 having adjacent the wall tubes 66 flanges 77 extending in opposite directions away from the associated boxes 69 and 72. The tube lengths 66 are suitably anchored to the flanges 77 in the manner described in connection with the plate 20 of FIGURES 3 to 5 and the flanges 56 and 57 of FIGURES 6 to 8.

It will be appreciated that the angle-section members 76 extend vertically between adjacent, vertically aligned boxes which in a wall comprise alternate boxes in respective circuits. It will also be appreciated that a wall having boxes as has been described in connection with FIGURES 9 to 15 will be suitably provided with a casing of sheet metal panels having external insulation and with horizontal buckstays similar to those previously described in connection with FIGURES 1 to 8.

It will be appreciated that each box could have associated therewith the adjacent ends of more than two pairs of tube ends and their associated transfer tubes. Thus, a box may serve three pairs of tube lengths and have leading thereto three lower transfer tubes and leading therefrom three upper transfer tubes. Suitably the contiguous tube lengths forming a group connected to a box have a flow therethrough in the same direction and are united with one another, for example, by short rods arranged in the recesses defined by the tubes and welded thereto.

In an alternative to the use of boxes as described in connection with FIGURES 10 to 15 a group of transfer tubes extending upwardly to respective inlets at a set of tube length ends may be connected by suitable tie means to a group of transfer tubes extending upwardly from the outlets of the set. In FIGURES 16 to 18 is shown a suitable connection for use in a furnace chamber wall of the nature described in connection with FIGURES 1 and 2 where tube lengths are arranged in groups of six pairs of tube lengths and having at each set of tube length ends twelve ends comprising six inlet ends 80A and six outlet ends 80B. At the inlet and outlet ends 80A and 80B, as shown in FIGURE 18, the tube length ends are bent outwardly from the wall, and as seen in FIGURE 17 the outwardly bent parts of tube length ends 80A are bent downwardly while the outwardly bent parts of tube length ends 80B are bent upwardly. The bending of the tube length ends 80A and 80B is such that the end parts 80A lie on one side of an upright plate 81 positioned normal to the wall of the furnace chamber while the end parts 80B lie on the opposite side of the plate 81.

As seen in FIGURE 16, adjacent a lower edge of the plate 81, the downwardly bent parts of the tube ends 80A are bent inwardly towards the lower edge of the plate 81, and at the edge are bent downwardly in upright manner. In a complementary manner, the upwardly bent parts of the tube ends 80B are bent inwardly towards the upper edge of the plate 81 and at the upper edge are bent upwardly in upright manner. The bending is such as to provide respective crank parts 82A and 82B in the tube ends 80A and 80B adjacent the lower and upper edges of the plate, the ends 80A and 80B respectively below and above the plate 81 having their axes lying in a common vertical plane normal to the furnace wall, and below and above the plate 81 they extend as, or are connected to upright transfer tubes 83 and 84, the transfer tubes 83 leading upwardly from outlet ends of a lower set of tube length ends and the transfer tubes 84 leading upwardly to inlet ends of an upper set of tube length ends. At its upper and lower edges, the plate 81 is rigidly secured to the cranked parts 82B and 82A respectively by welding the plate 81 being arranged to serve, as regards vertical loads, as an extension of the vertically aligned sets of transfer tubes 83 and 84.

Figure 20:
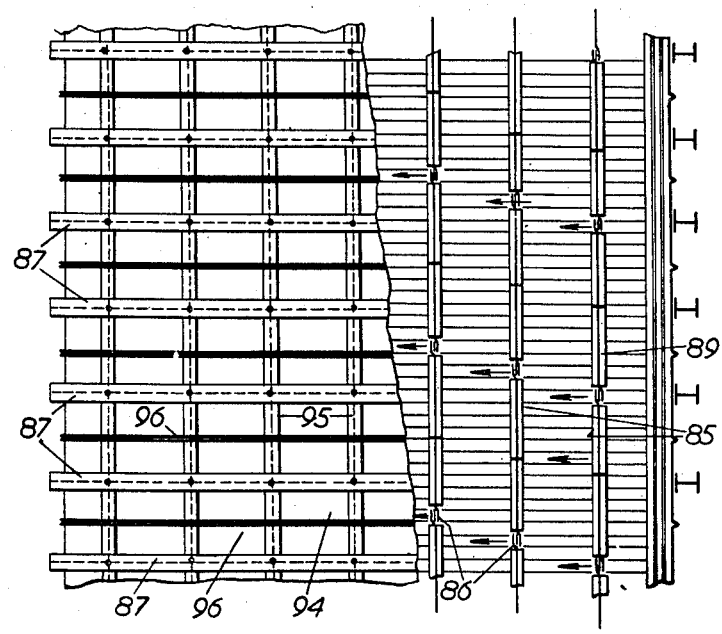
FIGURE 20 is a side elevation of part of a wall of the boiler of FIGURE 19, parts of the buckstays and the casing being removed at the right hand side of the figure.

In one particular arrangement to be described in connection with FIGURES 19 to 28 and utilizing suspension means as have been described in connection with FIGURES 16 to 18, there are eighty-four pairs of tube lengths in each of a number of furnace chamber zones, the tube lengths of each pair pass around different halves of the furnace chamber periphery, the inlet and outlet ends of one of the tube lengths being respectively adjacent the outlet and inlet ends of the other tube length of the pair. The tube lengths are disposed in fourteen groups each comprising six pairs of tube lengths, and from the previous description it will be appreciated that transfer tubes between associated groups will comprise groups of six transfer tubes. With each group of six pairs of tube lengths there are two sets of tube length ends, each set comprising six inlets and six outlets, the sets of ends being disposed at opposite sides of the furnace chamber. Each set of ends is associated with a group of six transfer tubes extending upwardly to the inlets of a corresponding group of tube lengths in the next adjacent upper section, and a group of six transfer tubes extending upwardly from the outlets of a corresponding group of tube lengths in the next adjacent lower section. There are thus, as seen in FIGURE 19, twenty-eight groups 85 of transfer tubes distributed around the furnace chamber periphery at each section, there being seven groups 85 in each wall and each group comprising six upright transfer tubes with their axes lying in a vertical plane normal to the adjacent wall. At each section there are twenty-eight suspension means of the nature described in connection with FIGURES 16 to 18, there being seven suspension means 86, located at distributed points in the width of each wall as is indicated in FIGURE 20.

Horizontal buckstays 87 are provided near the middle and a short distance above the top of each section of furnace chamber lining, the buckstays 87 being anchored at their centres and connected by links to the suspension means 86 at the adjacent wall substantially in the manner described in connection with FIGURES 3 to 8. As is shown in FIGURE 19, the buckstays 87, at their ends are connected by suitable brackets and links 88 to the corner of the furnace chamber wall as is known in buckstay practice.

In FIGURES 21 to 23, like reference numerals refer to similar parts in FIGURES 16 to 18, and it can be seen that each horizontal buckstay 87 is connected with each suspension means at the adjacent furnace chamber wall by means of plates 88 disposed at opposite sides of and welded to a group 85 of transfer tubes of the suspension means. The plates 88 extend inwardly towards the furnace wall beyond the group 85 of transfer tubes and serve to support an upright T section, cast iron stay 89 by means of a pin 90 passing through apertures in the plates 88 and the stem of the stay 89, adjacent the top of the stay, which projects between the plates 88. Each stay 89, as may clearly be seen in FIGURE 23, is also connected towards the bottom thereof, and at an intermediate point by respective pairs of plates 91 welded to the group 85 of transfer tubes at opposite sides thereof and projecting inwardly beyond the transfer tubes and at opposite sides of the stem of the stay 89. Respective pins 92 are fitted through apertures in the stem of the stay 89 and through apertures in the pairs of plates 91, the apertures in the plates 91 being vertically elongated to accommodate relative vertical movement between the stay 89 and the group 85 of tubes due to differential thermal expansion.

The head of each stay 89 is formed in its edges with staggered recesses 93 associated with tube length anchoring means 94 in the manner described in connection with the plate 20 and means 26 of FIGURES 3 to 5. The ends of adjacent stays 89 in different suspension means at a wall are, as seen in FIGURE 20, suitably staggered in stepped relationship so that ends of different stays 89 do not occur in the same horizontal line at a side of the furnace chamber.

A casing of sheet metal panels 94 is provided which may comprise flat panels 94A as shown in FIGURE 24 tangentially butting the outer sides of the wall tubes 80. Advantageously the panels 94B are corrugated in vertical section as seen in FIGURE 25, the corrugations having the same pitch and curvature as the tubes 80 which fit within the recesses of the corrugations. In this manner the thermal conductivity between the tube lengths and the casing panels 94B is improved so that the casing follows more rapidly temperature changes of the tube lengths and temperature differences between the tube lengths and casing are reduced. Moreover, the casing panels 94B are rigidified against horizontal flexure.

As may be seen most clearly in FIGURE 21, sections of casing at opposite sides of a group of transfer tubes 85 and associated stay 89, are connected by an upright substantially V-section channel member 95 adapted to afford resilience horizontally, and enclosing the group 85 of transfer tubes and associated plates 88 and stay 89. The member 95 is suitably welded to the plates supporting the buckstays where the plates 88 pass through to the member. Adjacent panels 94 are connected by V-section sealing strips 96 affording resilience vertically. Similarly, adjacent sections of channel member 95 are connected by V-section sealing strips 97 suitably curved to fit the cross section of the member 95 and affording resilience vertically.

In the arrangement of panels 94, channel member 95, and sealing strips 96 and 97, notwithstanding the rigidifying effect of the horizontal sealing strips as regards relative horizontal movement of panels 94 on opposite sides of a channel member 95, the relative horizontal movements are readily accommodated without unduly stressing any part of the casing owing to the relatively large depth of the vertically extending channel member 95.

Externally of the casing, suitable insulation 98 is provided.

Figure 27:
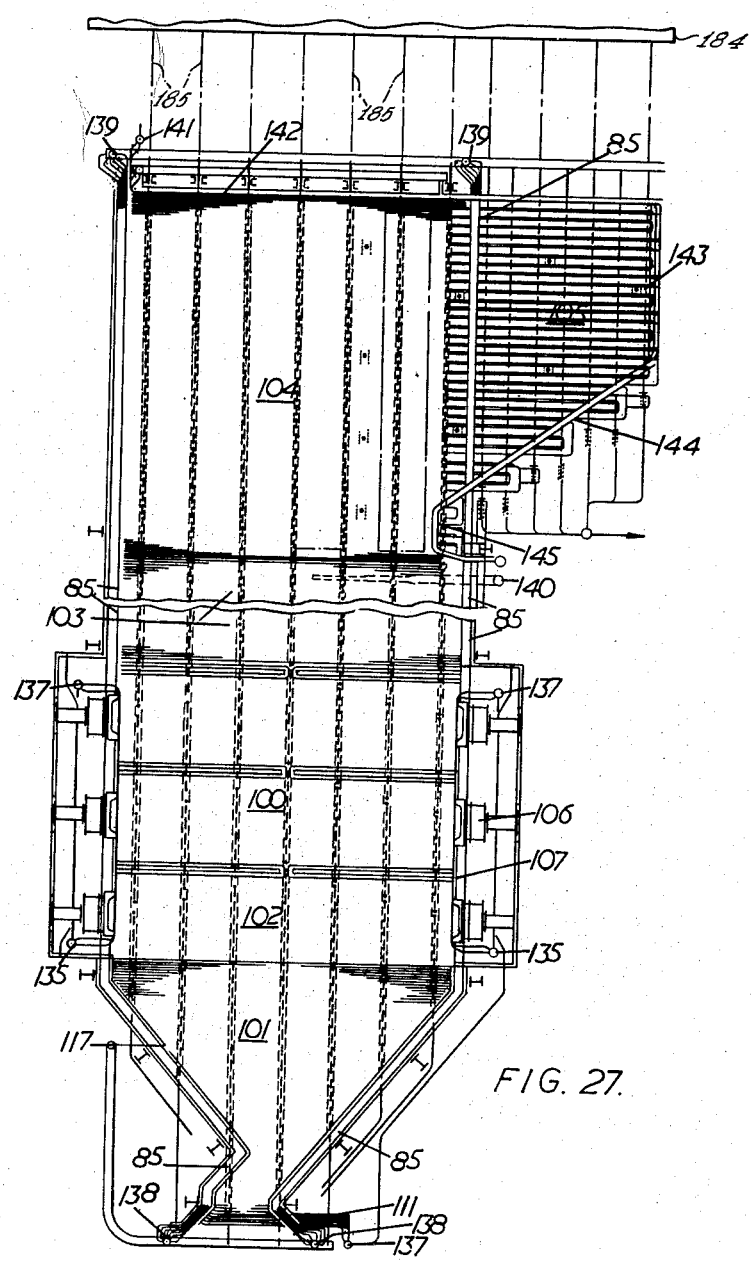
FIGURE 27 is a sectional front elevation of the furnace chamber of FIGURE 26.
Figure 28:
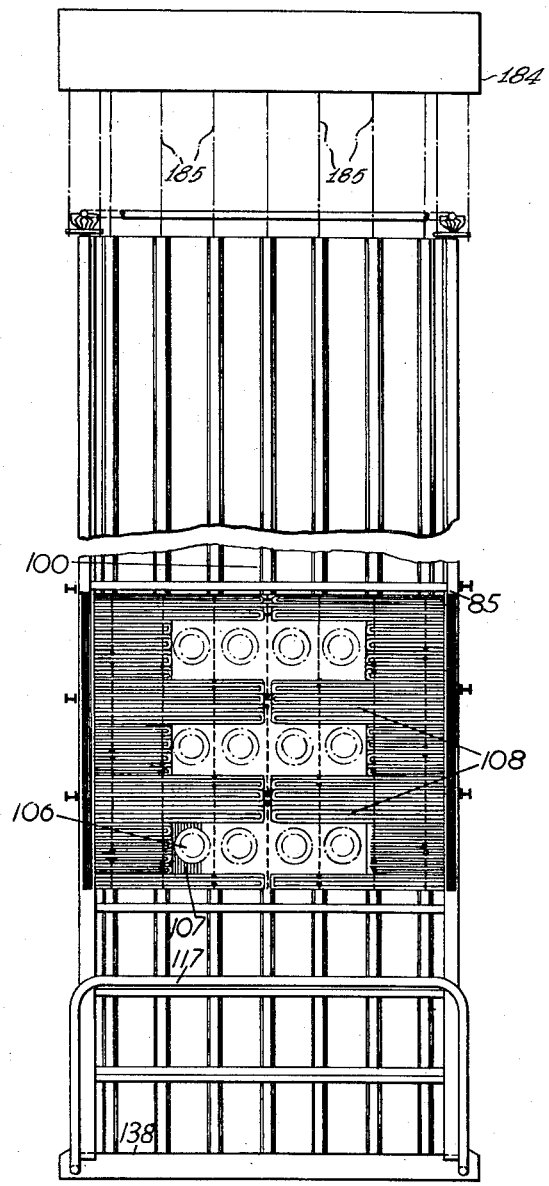
FIGURE 28 is a sectional side elevation of the furnace chamber of FIGURE 26.

In FIGURES 26 to 28 is shown a forced flow once through boiler unit embodying the wall construction and suspension means described in connection with FIGURES 16 to 25, that is an arrangement of fourteen groups of tube lengths each comprising six pairs of tube lengths providing two sets of twelve adjacent tube ends, and each group comprises two sets or bands of six contiguous tube lengths each tube length set or band extending around substantially one half of the furnace chamber periphery.

In the boiler of FIGURES 26 to 28 the furnace chamber 100 comprises a lower hopper zone 101, above which is a burner zone 102. Above the burner zone 102 is an intermediate zone 103 having the wall construction described in connection with FIGURES 16 to 25, and above the intermediate zone 103 is a top zone 104 whence a lateral gas pass 105 provides an outlet for the combustion gases from the furnace chamber 100. In the burner zone 102, burner means 106 are provided in a pair of opposite walls of the furnace chamber, in each of which burner walls the burners are arranged in three horizontal rows of four burners 106, the rows being vertically spaced. Each row of burners 106 is disposed in a wall part comprising vertical tube lengths 107 and the rows of burners are spaced apart by horizontal tube lengths 108.

In the burner zone 102, the arrangement of horizontal tube lengths described above is modified to accommodate the wall parts of upright tube lengths 107 and to this end, as is seen most clearly in FIGURE 26, each group 85 of transfer tubes terminating at the burner zone instead of extending into the furnace wall as a band or set of six tube lengths, extends into the wall as two bands of three in opposite directions. Thus, as seen at A in FIGURE 26, a group 85A of six transfer tubes extends upwardly to terminate at the level of a row of burners 106. The tubes of the group 85A are cranked sidewardly at their upper ends, a group 108 of alternate tubes being cranked in one direction and the remaining group 109 of three tubes cranked in the other direction. The groups 108 and 109 extend into the wall as separate bands at the same level and in opposite directions. Each group of three tube lengths, as may be seen in FIGURE 26 for the group 108, upon reaching an edge of a group of upright tubes 107 is reversed and the tube lengths thereof extend at a higher level so that there is a space 110 between the tube lengths at the higher and at the lower level. The tube lengths of the group 108A at the higher level extend around the furnace chamber wall in the opposite direction to those at the lower level and past the associated inlet groups 85A of transfer tubes to terminate at a group 85B of outlet transfer tubes which are spaced from the group of upright tubes in the opposite wall to that burner wall visible in FIGURE 26 by an amount substantially equal to the distance of the group 85A from the upright tube wall part visible in FIGURE 26. The group of tubes 109 extend in a similar manner to the tubes 108 but with respect to the opposite upright tube wall part, and the tubes 109 are similarly reversed to extend at a higher level and terminate at the outlet transfer tube group 85B. It will be appreciated that at detail B of FIGURE 26 a group of inlet transfer tubes is provided and extends into the wall as two sets of three tubes in a similar manner to the sets 110 and 109, but in this case the lower parts of the inlet tubes associated with detail B extend through the space 110 between upper and lower parts of the tubes 108 and on reversal the upper parts of the inlet tubes associated with detail B extend above the upper parts of tubes 108 to terminate at a group of outlet transfer tubes vertically aligned with the group 85A of inlet tubes at A. At the outlet transfer tubes the arrangement is similar to that described in connection with the inlet transfer tubes with the exception that the outlet transfer tubes extend upwardly from the tube length ends.

The modified arrangement described above in connection with the burner zone wall tubes is repeated as many times as is necessary to line the furnace chamber wall at the sides of the vertical tube group and to maintain symmetry of the circuits. It will be appreciated that with eighty-four circuits, the modified arrangement will appear fourteen times or a multiple of fourteen times.

The hopper zone 101 of the furnace chamber 100 is lined by a group of tubes forming panels of horizontal or substantially horizontal tube lengths, the panels being arranged in respective zones one above the other. Thus a group 111 of tubes arranged in two vertical rows 111A and 111B enters a lower part of a sloping side wall of the hopper 101 substantially at its middle as may be seen in FIGURE 26 where two tubes of the group 111 are shown comprising middle tubes of the rows 111A and 111B. At the hopper wall the rows 111A and 111B are bent to extend around the hopper in opposite directions to meet at the middle of the opposite sloping side wall thereof where they are reversely bent as indicated at 112. The tubes of the row 111A are so reversely bent that the lowermost tube assumes an uppermost position and the uppermost tube assumes a lowermost position in an upper row 113A of tube lengths serving to line part of the hopper 101 immediately above the part lined by the row 111A. It will be understood that the reverse bending of the row 111A of tubes serves to reverse the position of the tubes in the row 113A compared with their positions in the row 111A. The rows 113A of tube lengths extends around the hopper 101 in the opposite direction to the row 111A until it reaches a location in the wall of the hopper immediately above the entrance of the row 111A of tubes into the first mentioned sloping side wall where the tube lengths 113A are bent upwardly as indicated at 114 and reversed to extend in the hopper wall as a row 115A of tubes forming a panel immediately above and extending in the opposite direction to the row 113A of tube lengths, the position of the tubes in the row 115A being inverted compared with their positions in the row 113A. The row 115 of tubes extend around the hopper 101 to line an upper part thereof and at a location at the middle of the second mentioned sloping side wall of the hopper they are bent outwardly from the wall as indicated at 116 and are connected to a collector 117.

It will be appreciated that the rows of tubes 111A, 113A and 115A serve to line one half of the hopper 101 and that corresponding rows 111B, 113B and 115B serve to line the other half of the hopper in a similar manner. The rows of tubes 111A, 113A, 115A and the corresponding rows 111B, 113B and 115B provide two groups of panels, each group comprising three panels one above the other and connected in series by intermediate tube lengths 112A and 114A at the reverse bends, the tubes lengths 112A and 114A extending transversely of the tube lengths of the panels and forming part of the hopper lining.

Extending from the top zone 104 of the furnace chamber 104 is the lateral gas pass 105, and the furnace chamber walls in the top zone are lined by groups of tubes forming panels which help to line the sides of the gas pass 105. As seen in FIGURE 26 at the top zone 104, horizontal tubes 118 lining the furnace chamber are arranged in groups 119 and 120 of pairs of tube lengths, a single pair of each group being shown. The groups 119 and 120 enter at corresponding positions in opposite walls of the furnace chamber adjacent the lateral pass 105 and at a lower part thereof. At the walls the tubes of each pair are bent to extend in opposite directions, thus a pair of tubes of the group 119 comprises tubes 121 and 122, the tube 121 is bent towards the gas pass 105 and the tube 122 is bent away therefrom. The tube 121 extends sidewardly to line part of a gas pass side wall, and is then reversed to extend in the opposite direction as the tube 123 spaced above the tube 121. The tube 122 extends around the furnace chamber above the tube 121 and the tube 122 to a location above the point of entry of the group 120 where it is bent outwardly from the wall, and upwardly as indicated at 124 and then inwardly to re-enter the wall and help to form a second panel at a higher location. The other tube 122 of the group 119 extends in the opposite direction to the tube 121 to line the part of the furnace chamber and extends around the furnace chamber, past the point of entry of the group 120 to extend into and line part of the opposite side wall of the lateral gas pass 105 corresponding to the part lined by tube 121. The tube 122 is then reversely bent to extend as tube 125 spaced above the tube 123 and at a location adjacent the tube 124 the tube 125 is bent outwardly and then upwardly as indicated at 126, and then inwardly adjacent the tubes 124 with which it forms a pair.

The group 120 includes a pair of tubes 127 and 128 which extend in opposite directions in the furnace wall in a similar manner to the tubes 121 and 122 and at a level between tubes 121 and 123. The tubes 127 and 128 are reversely bent in a similar manner to the tubes 121 and 122 to provide upper tubes 129 and 130 extending above the tubes 123 and 125, the tubes 121, 122, 123, 125, 127 and 128 and the tubes of the associated groups serve to form a first panel 131. At a location adjacent the point of entry of the group 119, the tubes 129 and 130 are bent outwardly and then upwardly as indicated at 132 and then inwardly to re-enter the furnace wall at a higher level and help to form the second panel 133.

It will be understood that further panels such as the panels 131 and 133 are formed to line the furnace chamber throughout the vertical extent of the lateral gas pass, as may be seen in FIGURE 27, each panel comprising horizontal tube lengths connected in series at the return bends by short tube lengths forming part of the tube lining and adjacent panels being connected in series by intermediate tube lengths, as at 124, 126, and 132 extending in a similar manner to the transfer tubes 85 of the furnace lining below the top zone. It will be appreciated that the intermediate tube lengths may be strapped together to help provide suspension means in the manner described in connection with FIGURES 16 to 18, or may comprise boxes as described in connection with FIGURES 10 to 15.

As may be seen in FIGURE 26, upper extensions of the transfer tubes 85 extend upwardly from the intermediate zone 103 past the top zone 105, outside the furnace chamber, and these extensions suitably help to support the lining of the top zone. Suitably, also, the transfer tubes 85 help to support the groups of upright tubes 107 adjacent the burners.

The forced flow of working medium in the unit of FIGURES 26 to 28 is firstly to lower distributor means 135 associated with the upright tubes 107 adjacent the burners 106, upwardly through the tubes 107 to upper header means 136 and thence to a lower inlet header means 137 associated with the panels of the hopper bottom 101. From the header 137 the fluid flows in a generally upward direction through the panels of the hopper to the upper outlet header 117 which extends downwardly to connect with a lower distributor 138 with which the transfer tubes 85 are connected. The fluid then flows in a generally upward direction through the parallel connected circuits defined by the transfer tubes 85 and the horizontal tube lengths in the various zones and into an upper header 139 at the top of the unit. From the header 139 flow is downwardly to a lower inlet header 140 for the tubes forming the panels in the top zone 104 and through the panels in a generally upward direction to an upper header 141 from which extend tubes 142 suitably lining the top of the furnace chamber and the lateral gas pass 105, and forming a tube screen 143 at the outlet of the gas pass 105 and continuing to define a floor 144 to the gas pass end an arch baffle 145 extending into the furnace chamber below the pass 105. The transfer tubes 85 in the wall below the arch baffle 145 extend through the arch and upwardly across the lateral gas pass 105.

The vapor generator of the invention, in accordance with common practice, is top-supported. Thus structural steel members are provided, as illustrated in FIGS. 26–28, including horizontal steel members 184 from which hanger rods 185 extend downwardly for suitable mechanical connection to the upper ends of the transfer tubes 85. With the transfer tubes 85 so hung from above they act as columns for veritcally supporting the horizontal tube lengths to which they are connected. It will be understood that the transfer tubes and horizontal tube lengths of previously described embodiments are similarly top-supported.

As has been described in connection with FIGURE 20 there are 128 circuits connected in parallel and since each circuit in each zone a section of tubulous lining serves only a fraction of the periphery of the furnace chamber the zones may be limited depth. It therefore follows that the very progression of each circuit from zone to zone tends to compensate for variations in the normal heat transfer rate at different levels in the furnace chamber and abnormal variations due to local fouling of heat exchange surfaces. Generally it will be advantageous for the tube lengths of each circuit or the tube lengths of groups of circuits to occupy corresponding or substantially corresponding levels in the sections of lining serving the different zones. Since the tube lengths are disposed horizontally, the difficulties in obtaining equal heat input to the circuits due to differences in the rate of heat transmission to the heat exchange surfaces around the periphery of the furnace chamber is largely or wholly avoided.

Since the proportion of the periphery of the furnace chamber served by each tube length in a zone may be varied, the invention allows great flexibility in the number of parallel circuits employed and the diameter of tube used. The tube diameter in the different zones may be varied, the tube diameter most favourable to each particular zone being chosen.

Since the suspension means are heated together with the wall tubes, differential expansion in a vertical direction between the suspension means and the wall tubes is relatively small and the provision of a pressure tight casing is greatly facilitated.

I claim:

1. In a boiler having a forced circulation fluid circulation system, a plurality of fluid heating circuits arranged for parallel flow of fluid therethrough and connected into said circulation system and including substantially horizontal tube lenths, walls including a tubular lining forming an upright chamber, said tubular lining comprising sections extending one above the other, each section being formed by pairs of horizontal tube lengths of said circuits arranged in groups to provide sets of adjacent tube length ends distributed around said chamber, the horizontal tube lengths of each pair extending in opposite directions along the walls of said chamber, each set of tube length ends including inlet ends and outlet ends, and means for supporting said tube lengths including vertical suspension means, said last named means comprising groups of vertically extending transfer tubes disposed in most part exteriorly of and distributed around said chamber, horizontal tube lengths of each section being directly connected by a corresponding group of transfer tubes for serial flow of fluid to horizontal tube lengths of another section, each group of transfer tubes including first connector tubes leading and directly connected to the inlet ends of one of said sets of tube length ends to provide continuity between each first connector tube and its corresponding tube length, and second connector tubes leading from and directly connected to the outlet ends of said one set of tube length ends to provide continuity between each second connector tube and its corresponding tube length.

2. In a boiler having a forced circulation fluid circulation system, a plurality of fluid heating circuits arranged for parallel flow of fluid therethrough and connected into said circulation system and including substantially horizontal tube lengths, walls including a tubular lining forming an upright chamber, said tubular lining comprising sections extending one above the other, each section being formed by pairs of horizontal tube lengths of said circuits, each tube length of each pair of horizontal tube lengths having a separate inlet and outlet, the horizontal tube lengths of each pair extending in opposite directions along the walls of said chamber, and means for supporting said tube lengths including vertical suspension means, said last named means comprising groups of vertically extending transfer tubes disposed in most part exteriorly of and distributed around said chamber, the outlets of the horizontal tube lengths of each section being directly connected by a corresponding group of said transfer tubes for serial flow of fluid to the inlets of the horizontal tube lengths of another section.

3. In a boiler having a forced circulation fluid circulation system, a plurality of fluid heating circuits arranged for parallel flow of fluid therethrough and connected into said circulation system and including substantially horizontal tube lengths, walls including a tubular lining forming an upright chamber, said tubular lining comprising sections extending one above the other, each section being formed by pairs of horizontal tube lengths of said circuits arranged in groups to provide sets of adjacent tube length ends distributed around said chamber, the horizontal tube lengths of each pair extending in opposite directions along the walls of said chamber, each set of tube length ends including inlet ends and outlet ends, and means for supporting said tube lengths including vertical suspension means, said last named means comprising groups of vertically extending transfer tubes disposed in most part exteriorly of and distributed around said chamber, horizontal tube lengths of each section being directly connected by a corresponding group of transfer tubes for serial flow of fluid to horizontal tube lengths of another section, each group of transfer tubes including first connector tubes leading and directly connected to the inlet ends of one of said sets of tube length ends to provide continuity between each first connector tube and its corresponding tube length, and second connector tubes leading from and directly connected to the outlet ends of said one set of tube length ends to provide continuity between each second connector tube and its corresponding tube length, and horizontally extending buckstay means connected to said connector tubes and supporting said walls against horizontal movement.

4. A boiler as claimed in claim 2, wherein horizontal tube lengths of one of said sections are arranged in groups, and the tube lengths of each group are rigidly united to each other.

5. A boiler as claimed in claim 4, wherein the suspension means includes a vertically elongated plate having in each edge a series of slots, the slots in the two edges being staggered, and anchoring means are provided for the groups of horizontal tube lengths, the slots in one edge of said plate accommodating respective anchoring means of alternate groups of said group of horizontal tube lengths and the slots in the other edge of said plate accommodating the respective anchoring means of the remaining groups of said groups of horizontal tube lengths.

6. A boiler as claimed in claim 2, wherein a casing of sheet metal panels is applied to the horizontal tube lengths of said sections at the outer side thereof and resilient horizontal sealing strips are provided between adjacent panels and resilient vertical sealing strips are provided between the groups of transfer tubes and the adjacent panels.

7. A boiler as claimed in claim 6, wherein the vertical sealing strips are curved in horizontal cross-section to impart resilience.

8. A boiler as claimed in claim 1, wherein the connector tubes of each of said groups of transfer tubes serve to connect in series horizontal tube lengths in different sections.

9. A boiler as claimed in claim 2, wherein each tube length of each pair of tube lengths of each section has its ends remote from one another and adjacent the respective ends of the other tube length of the corresponding pair of the corresponding section, the tube lengths of each pair form parts of different circuits, tube lengths in each section form two adjacent pairs of tube lengths having a first set of four adjacent tube length ends and a second set of four adjacent tube length ends, some of the transfer tubes are associated with the first set of ends of each corresponding section and are arranged in pairs extending side by side, and others of the transfer tubes are associated with the second set of ends of each corresponding section and are arranged in pairs extending side by side.

10. A boiler as claimed in claim 9, wherein the horizontal tube lengths of each pair extend from adjacent inlet and outlet ends in opposite directions around different parts of the walls.

11. A boiler as claimed in claim 1, wherein said first and second connector tubes of each of said groups of transfer tubes are mechanically connected to each other.

12. A boiler as claimed in claim 1, wherein the first and second connector tubes of each of said groups of transfer tubes are disposed between and welded to spaced parallel plates anchored to some of the horizontal tube lengths.

References Cited in the file of this patent

UNITED STATES PATENTS

| | | |
|---|---|---|
| 1,995,034 | Mayo | Mar. 19, 1935 |
| 2,552,830 | Witzke | May 15, 1951 |
| 2,583,599 | Schoessow | Jan. 29, 1952 |
| 2,773,487 | Walter et al. | Dec. 11, 1956 |
| 2,999,483 | Armacost | Sept. 12, 1961 |
| 3,007,455 | Lieb et al. | Nov. 7, 1961 |
| 3,030,937 | Witzke | Apr. 24, 1962 |

FOREIGN PATENTS

| | | |
|---|---|---|
| 60,738 | Denmark | Mar. 15, 1943 |
| 269,397 | Great Britain | Apr. 21, 1927 |
| 837,994 | Great Britain | April 1960 |
| 863,344 | Germany | Jan. 15, 1953 |

OTHER REFERENCES

Combustion Article, "Avon No. 8," by C. A. Dauber, August 1956, pages 47–56. Combustion Pub. Co., Inc., 200 Madison Avenue, New York 16, N.Y. (Copy in Division 19.)